(12) United States Patent
Niessner et al.

(10) Patent No.: US 6,235,835 B1
(45) Date of Patent: May 22, 2001

(54) POLYMER-MODIFIED ANIONIC STARCH, METHOD FOR ITS PRODUCTION, AND ITS USE

(75) Inventors: Manfred Niessner, Schifferstadt; Claudia Nilz, Rödersheim-Gronau; Primoz Lorencak, Ludwigshafen; Martin Rübenacker, Altrip; Roland Ettl, Hassloch, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/341,139

(22) PCT Filed: Jan. 16, 1998

(86) PCT No.: PCT/EP98/00231

§ 371 Date: Jul. 14, 1999

§ 102(e) Date: Jul. 14, 1999

(87) PCT Pub. No.: WO98/31711

PCT Pub. Date: Jul. 23, 1998

(30) Foreign Application Priority Data

Jan. 17, 1997 (DE) .............................. 197 01 523

(51) Int. Cl.[7] .............................. C08B 31/00; C08L 3/06; D21H 17/28

(52) U.S. Cl. ..................... 525/54.24; 525/54.26; 162/168.1; 162/168.2; 162/168.3; 162/168.4; 162/175

(58) Field of Search ............... 525/54.24, 54.26; 162/168.1, 168.2, 168.3, 168.4, 175

(56) References Cited

U.S. PATENT DOCUMENTS

| | | |
|---|---|---|
| 3,467,608 | 9/1969 | Dishburger et al. . |
| 3,642,572 | 2/1972 | Endres et al. . |
| 3,734,802 | 5/1973 | Cohen . |
| 4,097,427 | 6/1978 | Aitken et al. . |
| 4,144,123 | 3/1979 | Scharf et al. . |
| 4,146,515 | 3/1979 | Buikema et al. . |
| 4,818,341 | 4/1989 | Degen et al. . |
| 4,880,497 | 11/1989 | Pfohl et al. . |
| 4,940,514 | 7/1990 | Stange et al. . |
| 4,978,427 | 12/1990 | Pfohl et al. . |
| 5,262,008 | 11/1993 | Moench et al. . |

FOREIGN PATENT DOCUMENTS 2 292 394 * 2/1996 (GB) .

OTHER PUBLICATIONS

Derwent Abstracts, Derwent Publications Ltd., AN 88–050951, DE 3719 480, Feb. 18, 1988.

Ullmanns Encyklopädie der Technischen, 4th Edition, vol. 17, pp. 581–635, 1979 (With English Abstract).

Günther Tegge, Stärke und Stärkederivate, pp. 179–185, 1984 (With English Abstract).

Günther Tegge, Stärke und Stärkederivate, pp. 157–160, 1984.

* cited by examiner

*Primary Examiner*—Nathan M. Nutter
(74) *Attorney, Agent, or Firm*—Oblon, Spivak, McClelland, Maier & Neustadt, P.C.

(57) ABSTRACT

Starch is modified with at least one cationic polymer P) and the modified starch is prepared by a process in which
a) an anionically modified starch A) is reacted with a cationic polymer P) or
b) a natural starch B) or a starch C) which has not been anionically modified is reacted with the cationic polymer P) in the presence of an anionic modifier M)

and the polymer-modified starch is used.

25 Claims, No Drawings

POLYMER-MODIFIED ANIONIC STARCH, METHOD FOR ITS PRODUCTION, AND ITS USE

CROSS-REFERENCE TO RELATED APPLICATIONS

This application claims the benefit of priority to PCT/EP98/00231 filed on Jan. 16, 1998 and DE 19701523.9 filed on Jan. 17, 1997.

DESCRIPTION

The present invention relates to anionic starch derivatives modified with polymers which contain cationic groups and/or groups convertible into cations, processes for their preparation and their use as assistants in the production of paper, board and cardboard, in particular as dry strength agents for paper.

BACKGROUND OF THE INVENTION

The use of digested, water-soluble starches and of water-soluble starch derivatives as assistants in papermaking, in particular for increasing the strength of the paper, is described generally in Ullmanns Enzyklopädie der Technischen Chemie, 4th edition, Verlag Chemie, Weinheim, 1979, vol. 17, page 581 et seq. However, the retention of the dissolved starches in the paper is poor, leading to considerable pollution of the waste waters.

U.S. Pat. No. 3,734,802 describes the use of cationic dextran graft copolymers as additives for improving the dry strength of paper. The graft copolymers are added to an aqueous cellulose dispersion. This mixture is then used for the production of paper sheets. The graft copolymers are prepared by grafting dextran, a naturally occurring polymer having an average molecular weight of from about 20,000 to about 50,000,000, with cationic monomers, for example diallylic, quaternary ammonium compounds, such as diallydimethylammonium chloride, or acrylic, quaternary ammonium compounds such as dimethylaminoethyl methacrycate, and mixtures thereof with acrylamide or methacrylamide. The graft copolymerization is preferably carried out in the presence of a redox catalyst, for example one based on cerium.

U.S. Pat. No. 3,467,608 describes a process for the preparation of a cationic starch by heating an aqueous starch suspension with the addition of a polyalkyleneimine, such as polyethyleneimine, or a polyalkylene polyamine, such as polyethylenepolyamine, the molecular weight of the polymer used for the modification being at least 50,000. The reaction mixture contains from 0.5 to 40% by weight of the polymer and from 60 to 99.5% by weight of starch, percentages being based on solids content. It is true that the possibility of using modified starches obtainable by hydrolysis, oxidation, esterification and etherification is also described generally. However, the publication gives no indication of the use of anionically modified starches. All preferred embodiments relate to unmodified potato and corn starch. The resulting cationic starch derivatives are used as flocculants.

U.S. Pat. No. 4,097,427 describes a process for the conversion of starch into cationic form, an aqueous starch suspension being reacted under alkaline reaction conditions with a water-soluble polymer which contains quaternary ammonium groups in the presence of an oxidizing agent. Exclusively unmodified or slightly degraded starches are used for the modification, preferably corn starch and tapioca starch. The polymers containing quaternary ammonium groups are selected from polymers having epichlorohydrin units, quaternized polyethylene imines, quaternized diallyl-dialkylamine polymers etc. The oxidizing agents used are, for example, ammonium persulfate, hydrogen peroxide, sodium hypochlorite, ozone or tert-butyl hydroperoxide. The pH of the starch suspension is brought to about 8 with water-soluble bases. The modified cationic starches thus prepared are added to the paper stock as strength agents during papermaking. In this process, however, the waste water has a very high COD value (COD=chemical oxygen demand).

U.S. Pat. No. 4,146,515 describes a process for the preparation of a gelatinous, cationic starch for the surface sizing and coating of cellulosic material. An aqueous suspension of a partially oxidized starch is digested together with a cationic polymer in a continuous digester The cationic polymers used are condensates of epichlorohydrin and dimethylamine, polymers of diallyldimethylammonium chloride, quaternized reaction products of vinylidene chloride and ammonia, quaternized polyethylene imine and quaternized polyepichlorohydrin. The starches used are starches which have been partially oxidized, for example with sodium hypochlorite and which are also ambiguously referred to as anionic starches in the publication. The publication gives no indication of a possible modification of starch esters and starch ethers usually referred to as anionic starches.

DE-A-37 19 480 and EP-A-0 282 761 describe a process for the production of paper, board and cardboard having high dry strength by the addition of a dry strength agent comprising a mixture of cationic polymers and starch to the paper stock. The cationic polymers contain, as characteristic monomers, polymerized units of diallyldimethylammonium chloride, N-vinylamine or N-vinylimidazoline. Polyethylene imine may also be used as the cationic polymer. For the preparation of the dry strength agents, either an aqueous suspension of a natural potato starch is digested in the presence of the polymers by heating to above the glutinization temperature in the absence of oxidizing agents, polymerization initiators and alkalis or a digested potato starch is reacted with the cationic polymers at from 15 to 70° C. Exclusively natural or thermally degraded potato starch is used and the modification with the cationic polymers is carried out in aqueous suspension or in aqueous solution.

EP-A-0 301 372, makes a similar disclosure, cationically modified, enzymatically degraded starchs being used.

U.S. Pat. No. 4,880,497 and U.S. Pat. No. 4,978,427 describe water-soluble copolymers which contain vinylamine units and their use as wet strength agents and dry strength agents for paper. The polymers are prepared by copolymerizing N-vinylformamide and an ethylenically unsaturated monomer selected from vinyl acetate, vinyl propionate, alkyl vinyl ethers, esters, nitrites and amides of acrylic and methacrylic acid and N-vinylpyrrolidone and subsequently hydrolyzing from 30 to 100 mol % of the formyl groups of the resulting copolymer with formation of amino groups. The hydrolyzed copolymers are used for papermaking in amounts of from 0.1 to 5% by weight, based on dry fibers.

EP-A-0 418 343 likewise describes a process for the production of paper, board and cardboard by draining a paper stock in the presence of polymers containing N-vinylformamide units. Unhydrolyzed copolymers which contain as the polymerized units N-vinylformamide and at least one further monomer containing cationic groups are used. These additional monomers are selected from the group consisting of the (meth)acrylamides having alkyleneammonium radicals or from the group consisting of the diallyldialkylammonium compounds. In order to achieve good retention with respect to paper fibers when these copolymers are used as dry strength agents for paper, an aqueous solution prepared beforehand by heating the aqueous copolymers together with natural potato starch to above the glutinization temperature of the starch in the absence of oxidizing agents, polymerization initiators and alkalis is added to the paper stock.

WO 96/13525 describes a process for the cationic modification of starch by reacting various natural starches and wax starches with polymers which contain amino and/or ammonium groups. The reaction is carried out in aqueous solution at elevated temperatures and superatmospheric pressure in the absence of oxidizing agents, polymerization initiators and alkalis, the starch being sufficiently digested and only a slight molecular weight decrease of not more than 10% by weight of the starch occurring. The cationic starches thus obtained are used as dry strength agents in papermaking.

The properties of the abovementioned starch derivatives modified with cationic polymers are worthy of improvement, in particular with respect to their use as assistants for papermaking. Thus, good retention of the respective dry strength agent by the cellulose fibers is required for achieving good mechanical strength of the product in the dry state. It is an object of the present invention to provide cationically modified starches which have improved starch retention by the paper fibers and, when used as dry strength agents, therefore give a paper product having good mechanical properties.

BRIEF SUMMARY OF THE INVENTION

We have found, surprisingly, that this object is achieved if cationic polymers are added to anionically modified starch.

The present invention therefore relates to a process for the preparation of starch which is modified with at least one cationic polymer P), wherein
a) an anionically modified starch A) is reacted with the cationic polymer P) or
b) a natural starch B) or a starch C) which is not anionically modified is reacted with the cationic polymer P) in the presence of an anionic modifier M).

The reaction of the starch A) with the cationic polymer P) or of the starches B) or C) with the cationic polymer P) and the anionic modifier M) is carried out in water or in an aqueous medium, ie. in a mixture of water and a water-miscible solvent.

The weight ratio of water or aqueous medium to starch is in general from about 1:0.0005 to 1:0.2, preferably from 1:0.001 to 1:0.1, in particular from 1:0.02 to 1:0.06.

The weight ratio of starch to cationic polymer P) is in general from about 1:0.0005 to 1:2, preferably from about 1:0.001 to 1:1, in particular from about 1:0.01 to 1:0.1.

The cationic modification of the starch is carried out in general at from about 80 to 220° C., preferably from 100 to 200° C., in particular from 120 to 140° C. The temperature is preferably above the glutinization temperature of the starch so that digestion of the starches also occurs essentially simultaneously with the modification.

The cationic modification can be carried out in principle under reduced, atmospheric or superatmospheric pressure. In general, the modification is carried out at the pressure developed by the reaction medium at the abovementioned temperatures. It is in general from about 1.0 to 10.0, preferably 1.2 to 7.9, bar.

In a preferred embodiment, the reaction mixture is exposed to the reaction of shear forces during the reaction. This can be effected, for example, by stirring the suspension or solution at a speed of from about 100 to 2000 rpm, preferably from 200 to 1000 rpm.

If the novel process described above for cationic starch modification is carried out at above the glutinization temperature, digestion of the starch also takes place. According to the novel process, the starch is preferably digested to a degree of at least 80% by weight, in particular of at least 90% by weight.

Starch digestion is understood as the conversion of the solid starch grains into a water-soluble form, superstructures (helix formation, intermolecular H bridges, etc.) being eliminated without there being any substantial degradation of the amylose and amylopectin units of which the starch is composed to give oligosaccharides or glucose.

In a particularly preferred embodiment of the novel process, the modification of the starch with the cation polymer P) and, if required, an anionic modifier M) and the starch digestion take place at above 100° C., preferably at from 105 to 170° C., at superatmospheric pressure of from about 1.2 to 7,9 bar and with simultaneous vigorous stirring. Under these reaction conditions, at least 80, preferably at least 90, in particular more than 95, % by weight of the starch are digested and modified with the cationic polymer. The degration rate with respect to the molecular weights of the starches used is in general low. Thus, the molecular weight of the starches is generally reduced by at most 20%, preferably at most 10%, in particular at most 5%.

During digestion, the starch is preferably dissolved to give a clear solution so that, after the reaction, no more unconverted starch can be filtered off during filtration of the reaction solution with a cellulose acetate membrane having a pore diameter of 1.2 $\mu$m. If desired, however, any insoluble starch residues present can be separated from the product in this manner. The degree of degradation of the starch can be quantitatively determined with the aid of gel permeation chromatography. The degree of starch digestion from the swollen starch grain to the completely dissolved starch can be determined with the aid of investigations by microscopy and electron microscopy.

The reaction can be carried out in the conventional apparatuses in which starch is digested in industry. At above 100° C., the reaction has to be carried out in pressure-resistant apparatuses, such as pressure-resistant stirred kettles, autoclaves, kneaders, jet digesters, extruders, etc. The required contact time depends on the temperature used. In general, the digestion of the starch is carried out over a period of from 0.1 second to 6 hours, preferably from 0.2 second to 5 hours, particularly preferably from about 0.5 second to 30 minutes. If the digestion is carried out at relatively high temperature, for example at from about 100° C. to 200° C., shorter contact times, for example from about 0.1 second to 15 minutes, are generally required.

For the starch digestion, if desired additives which support the digestion of the starch and additives which influence the molecular weight of the starch, for example acids, or further paper assistants may be added.

The present invention furthermore relates to the digested, anionic starches obtained by the novel process and modified with the cationic polymer P).

In general, polymers P) which contain cationic groups or groups which can be converted into cationic form are suitable for the novel process. Such groups are derived in general from heteroatoms such as N, P, O, S etc., which are capable of forming stable cations, for example after reaction with an acid or with an alkylating agent. Preferably, polymers which contain amino and/or ammonium groups are suitable for the novel process. These compounds are also referred to as cationic polymers. Suitable cationic polymers are described in EP-A-0 282 761, EP-A-0 301 372, EP-A-0 418 343 and WO 96/13525, which are hereby fully incorporated by reference.

The suitable cationic polymers contain units of monomers having cationic groups or groups which can be converted into cationic groups, selected from a) N-vinylamines of Formula I

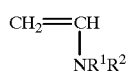

(I)

wherein $R^1$ and $R^2$ independently of one another, are each hydrogen or alkyl;

b) aziridines (alkyleneimines) of the formula II

(II)

where $R^3$ is hydrogen or alkyl;

c) diallyldialkylammonium compounds;

d) N-vinylimidazolines of the formula III

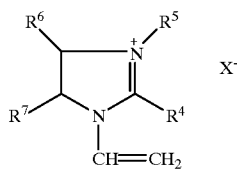

(III)

wherein $R^4$ and $R^5$ independently of one another, are each hydrogen, alkyl, aryl or alkylaryl, $R^6$ and $R^7$ independently of one another, are each hydrogen or alkyl and, $X^-$ is an opposite ion, preferably selected from $F^-$, $Cl^-$, $Br^-$, $I^-$, $SP_4^{2-}$, $HSO_4^-$, akyl-O-$SO_3H^-$, or $R^8$—$COO^-$, where $R^8$ is a radical selected from alkyl, cycloalkyl, aryl, cycloalkylalkyl and arylalkyl, which may be unsubstituted or substituted;

e) aminoalkyl-substituted esters and amides of acrylic acid and methacrylic acid of the formula IV

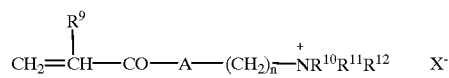

(IV)

wherein n is an integer from 1 to 6,

A is O or NH, $R^9$ is hydrogen or methyl, $R^{10}$, $R^{11}$ and $R^{12}$ independently of one another, are each hydrogen, alkyl, cycloalkyl, aryl, cycloalkylalkyl or arylalkyl and $X^-$ has the abovementioned meanings, and, if required, further comonomers as polymerized units.

In the present invention, the term alkyl means straight-chain and branched alkyl groups. These are preferably straight-chain or branched $C_1$–$C_{18}$-alkyl, in particular $C_1$–$C_8$-alkyl, preferably $C_1$–$C_6$-alkyl- and particularly preferably $C_1$–$C_4$-alkyl. Examples of alkyl are in particular, methyl, ethyl, propyl, isopropyl, n-butyl, 2-butyl, 2-methylpropyl, tert-butyl, n-pentyl, 2-pentyl, 3-pentyl, 2-methylbutyl, 3-methylbutyl, 1,2-dimethylpropyl, 1,1-dimethylpropyl, 2,2-dimethylpropyl, n-hexyl, 2-hexyl, 3-hexyl, 2-methylpentyl, 3-methylpentyl, 4-methylpentyl, 1,2-dimethylbutyl, 1,3-dimethylbutyl, 2,3-dimethylbutyl, 1,1-dimethylbutyl, 2,2-dimethylbutyl, 2,3-dimethylbutyl, 1,1-dimethylbutyl, 2,2-dimethylbutyl, 3,3-dimethylbutyl, 1,1,2-trimethylpropyl, 1,2,2-trimethylpropyl, 2-ethylbutyl, 1-ethyl-2-methylpropyl, n-heptyl, 2-heptyl, 3-heptyl, 4-heptyl, 2-ethylpentyl, 2-ethylhexyl, octyl, decyl, dodecyl etc.

Substituted alkyl radicals preferably have 1, 2 or 3 substituents, in particular 1 or 2 substituents in any desired position.

The cycloalkyl group is preferably $C_5$–$C_7$-cycloalkyl, such as cyclopentyl, cyclohexyl or cycloheptyl.

If the cycloalkyl group is substituted, it preferably has 1, 2, 3, 4 or 5, in particular 1, 2 or 3, alkyl radicals as substituents.

Aryl is preferably phenyl or naphthyl, in particular phenyl.

Substituted aryl or cycloalkyl radicals have as substituents, for example, $C_1$–$C_8$-alkyl, $C_1$–$C_8$-alkoxy, halogen, nitro or carboxyl. As a rule 1, 2 or 3 substituents are preferred.

Alkylaryl is preferably phenyl-$C_1$–$C_4$-alkyl, in particular benzyl or phenethyl.

In a preferred embodiment, the cationic polymers P) contain units of N-vinylamines of the formula (I) as polymerized units, where $R^1$ is hydrogen or alkyl and $R^2$ is hydrogen. Such polymers are obtainable, for example, by complete or partial hydrolysis of homo- or copolymers of open-chain N-vinylcarboxamides of the formula (V)

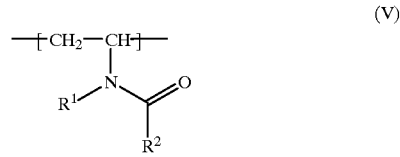

(V)

where $R^1$ and $R^2$ independently of one another, are each hydrogen or $C_1$–$C_6$-akyl, with elimination of the —$COR^2$ group. Examples of suitable N-vinylcarboxamides are N-vinylformamide, N-vinyl-N-methylformamide, N-vinyl-N-ethylformamide, N-vinyl-N-propylformamide, N-vinyl-N-isopropylformamide, N-vinyl-N-butylformamide, N-Vinyl-N-sec-butylformamide, N-vinyl-N-tert-butylformamide and N-vinyl-N-pentylformamide. For the preparation of the polymers P), these monomers may be polymerized either alone or as mixtures. Homopolymers of N-vinylformamide are preferably used as starting materials.

The hydrolysis of the polymerized N-vinylcarboxamides to give the corresponding amines is carried out by conventional prior art methods in the presence of hydrolysis agents, such as mineral acids, preferably hydrochloric acid and sulfuric acid, or bases, in particular alkali metal and alkaline earth metal hydroxides or ammonia. Hydrolysis in aqueous solution has proven particularly useful.

The hydrolyzed polymers which contain units of the formula (I) where $R^2$ is hydrogen have K values of from 15 to 300, for example 30 to 200, determined according to H. Fikentscher in 5% strength by weight aqueous sodium chloride solution at pH 7, at 25° C. and at a polymer concentration of 0.5% by weight.

The cationic polymer P) obtainable by hydrolysis of polymerized N-vinylcarboxamides and having vinylamine units of the formula (I) may additionally contain further comonomer units.

Preferably, a copolymer of vinyl amines is used as polymer P), whose comonomers are selected from N-vinylcarboxamides, vinyl alcohol, esters of vinyl alcohol with monocarboxylic acids, α,β-monoethylenically unsaturated mono- and dicarboxylic acids and their salts, esters, amides and nitriles, heterocycles having N-vinyl groups, α,β-monoethylenically unsaturated sulfonic acids and their esters, and mixtures thereof.

Preferably used cationic polymers P) are those which contain
i) from 0.1 to 100 mol % of vinylamine units of the formula (I),
ii) from 0 to 99.9, preferably from 1 to 99, mol % of polymerized units of further monoethylenically unsaturated monomers, preferably selected from N-vinylformamide, vinyl alcohol, esters of vinyl alcohol with $C_1$–$C_8$-monocarboxylic acids, $C_1$–$C_8$-vinyl ethers, α,β-unsaturated $C_3$–$C_{18}$-mono- and/or $C_4$–$C_{20}$-dicarboxylic acids and their salts, esters, amides and nitriles and N-vinyllactams, and
iii) from 0 to 5 mol % of polymerized units of polymerized units of monomers having at least two ethylenically unsaturated, nonconjugated double bonds.

In addition to the abovementioned N-vinylcarboxamides, examples of monomers are group ii) or vinyl alcohol, obtainable by partial or complete hydrolysis of corresponding vinyl esters, preferably of vinyl acetate, and vinyl esters of saturated carboxylic acids of 1 to 6 carbon atoms, e.g. vinyl formiate, vinyl acetate, vinyl propionate and vinyl butyrate. Unsaturated $C_3$–$C_6$-mono- or dicarboxylic acids, eg. acrylic acid, methacrylic acid, maleic acid, crotonic acid, itaconic acid and vinyl acetic acid, and their alkali metal and alkaline earth metal salts, esters, amides and nitriles, for example methyl acrylate, methyl methacrylate, ethyl acrylate and ethyl methacrylate, or glycol esters or polyglycol esters of ethylenically unsaturated carboxylic acids, wherein each case only one OH group of the glycols and polyglycols is esterified, eg. hydroxyethyl acrylate, hydroxyethyl methacrylate, hydroxypropyl acrylate, hydroxybutyl acrylate, hydroxypropyl methacrylate, hydroxybutyl methacrylate and the monoesters of acrylic acid with polyalkylene glycols having a molecular weight of from about 1500 to 10,000 are also suitable. The esters of ethylenically unsaturated carboxylic acids with amino alcohols, eg. dimethylaminoethyl acrylate, dimethylaminoethyl methacrylate, diethylaminoethyl acrylate, diethylaminopropyl methacrylate, diethylaminopropyl acrylate, dimethylaminopropyl methacrylate, diethylaminopropyl acrylate, diethylaminopropyl methacrylate, dimethylaminobutyl acrylate and diethylaminobutyl acrylate, are furthermore useful. The basic acrylates are used in the form of the free bases, of the salts with amino acids, eg. hydrochloric acid and sulfuric acid and nitric acid, of the salts with organic acids, such as formic acid or benzenesulfonic acid, or in quaternized form. Suitable quatenizing agents are, for example, dimethyl sulfate, diethyl sulfate, methyl chloride, ethyl chloride and benzyl chloride.

Other suitable comonomers ii) are unsaturated amides, for example acrylamide, methacrylamide and N-alkylmonoamides and N-alkyldiamides having alkyl radicals of 1 to 6 carbon atoms, eg. N-methylacrylamide, N,N-dimethylacrylamide, N-methylmethacrylamide, N-ethylacrylamide, N-propylacrylamide and tert-butylacrylamide, and basic (meth)acrylamides, such as dimethylaminoethylacrylamide, dimethylaminoethylmethacrylamide, diethylaminoethylacrylamide, diethylaminoethylmethacrylamide, dimethylaminopropylacrylamide, diethylaminopropylacrylamide, dimethylaminopropylmethacrylamide and diethylaminopropylmethacrylamide.

Suitable comonomers ii) are also vinyl ethers having alkyl radicals of from 1 to 6 carbon atoms, eg. methyl vinyl ether, ethyl vinyl ether, propyl vinyl ether, isopropyl vinyl ether, n-butyl vinyl ether, n-pentyl vinyl ether and n-hexyl vinyl ether, or vinyl ethers having aromatic substitutents, such as phenyl vinyl ether or benzyl vinyl ether.

Other suitable comonomers ii) are N-vinyl pyrrolidone, N-vinyl caprolactam, acrylonitrile, methacrylonitrile, N-vinylimidazole and substituted N-vinylimidazoles, such as N-vinyl-2-methylimidazole, N-vinyl-4-methylimidazole, N-vinyl-5-methylimidazole, and N-vinyl-2-ethylimidazole, and N-vinylimidazolines, eg. vinylimidazoline, N-vinyl-2-methylimidazoline, and N-vinyl-2-ethylimidazoline. N-vinylimidazoles and N-vinylimidazolines are used not only in the form of the free bases but also in a form neutralized with mineral acids or with organic acids or in quaternized from, quaternization preferably being carried out with dimethylsulfate, diethylsulfate, methyl chloride or benzyl chloride.

Furthermore, sulfo-containing monomers, for example vinylsulfonic acid, allylsulfonic acid, methallylsulfonic acid, styrene-sulfonic acid or 3-sulfopropyl acrylate, are suitable as comonomers ii).

When basic comonomers ii) are used, for example basic acylates and acrylamides, it is often possible to dispense with hydrolysis of the N-vinylcarboxamides. The copolymers also comprise terpolymers and those polymers which additionally contain at least one further monomer as polymerized units.

The abovementioned polymers P) based on vinylamine units may furthermore contain from 0 to 5 mol % of polymerized monomer units having at least two ethylenically unsaturated, nonconjugated double bonds. Such comonomers iii) are usually used in the copolymerization as crosslinking agents. The presence of these comonomers in the copolymerization results in an increase in the molar masses of the copolymers. Suitable compounds iii) are, for example, methylenebisacrylamide, esters of acrylic acid and methacrylic acid with polyhydric alcohols, eg. glycol diacrylate, glyceryl triacrylate, glycol dimethacrylate, glyceryl trimethacrylate and polyols, such as pentaerythritol and glucose, which are at least diesterified with acrylic acid or with methacrylic acid. Other suitable crosslinking agents are divinylbenzene, divinyldioxane, pentaerythrityl triallyl ether, pentaallylsucrose, divinylurea and divinylethyleneurea.

In particular, copolymers P) which contain
1) from 1 to 100 mol % of polymerized vinylamine units and
2) from 0 to 99 mol % of polymerized monomer units selected from vinyl formiate, vinyl acetate, vinyl propionate, N-vinylformamide, vinyl alcohol, acrylonitrile and N-vinylpyrrolidone are used for the cationic modification of the starch.

Preferred cationic polymers P) are hydrolyzed homopolymers of N-vinylformamide and copolymers of vinylamine units 1) and monomer units 2) having a degree of hydrolysis of from 2 to 100, preferably from 30 to 95, mol %.

In the case of copolymers which contain vinyl esters as polymerized units, hydrolysis of the ester groups takes place with formation of vinyl alcohol units, in addition to hydrolysis of the N-vinylformamide units. Polymerized acrylonitrile is likewise chemically modified in the hydrolysis, for example amido, and/or carboxyl groups being formed.

The cationic polymer P) may furthermore contain aziridines of the formula (II) as monomers. Ethyleneimine is preferably used, ie. $R^3$ is preferably hydrogen.

The polymers P) are then preferably homopolymers, ie. polyethylene imines which are obtainable by polymerizing ethylene imine in the presence of acidic catalyst, such as ammonium bisulfate, hydrochloric acid or chlorinated hydrocarbons, such as methyl chloride, ethylene chloride, carbon tetrachloride or chloroform. Such polyethylene imines have, for example in 50% strength by weight aqueous solution, a viscosity of from about 500 to 33,000, preferably from 1000 to 31,000 mPa.s (measured according to Brookfield at 20° C. and 20 rpm). The cationic polymers P) of this group include polyamidoamines which are grafted with ethylene imine and, if required, may furthermore be crosslinked by reaction with a bifunctional or polyfunctional crosslinking agent. Products of this type are prepared, for example, by condensation of a dicarboxylic acid such as adipic acid, with a polyalkylenepolyamine, such as diethylenetriamine or triethylenetetramine, grafting with ethyleneimine and reaction with a bifunctional or polyfunctional crosslinking agent, for example bischlorohydrin ethers of polyalkylene glycols, as described, for example in U.S. Pat. No. 4,144,123 and U.S. Pat. No. 3,642,572.

Cationic polymers P) with monomers of the above type c), which contain diallyldialkylammonium compounds as characteristic monomer unit, are also suitable for the starch modification. Polymers of this type are disclosed, for example, in U.S. Pat. No. 4,146,515. Diallyldimethylammonium chloride is preferably used. Polymers of diallydimethylammonium chloride are to be understood as meaning primarily homopolymers and copolymers with acrylamide and/or methacrylamide. The copolymerization can be carried out using any desired monomer ratio. The K value of the homo- and copolymers of diallyldimethylammonium chloride is in general at least 30, preferably from 95 to 180.

Other suitable cationic polymers P) are homo- and copolymers of unsubstituted or substituted N-vinylimidazolines d) of the formula (III).

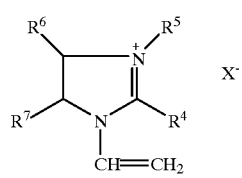

(III)

These may be prepared, for example, by the process of DE-B-11 82 826, where copolymers together with acrylamide and/or methacrylamide may be prepared in an aqueous medium at a pH from 0 to 8, preferably from 1.0 to 6.8, in the presence of polymerization initiators which decompose to give free radicals.

1-Vinyl-2-imidazoline salts of the formula (III), where $R^6$ and $R^7$ are both hydrogen, are preferably used in the polymerization.

The opposite ion $X^-$ in the formula (III) may in principle be any desired acid radical of an inorganic or of an organic acid. The monomers of the formula (III) are obtained by neutralizing the free bases, ie. 1-vinyl-2-imidazolines, with an equivalent amount of acid. The vinylimidazolines may also be neutralized with, for example, trichloroacetic acid, benzenesulfonic acid or toluenesulfonic acid, in addition to the abovementioned acid radicals. Apart from salts of 1-vinyl-2-imidazolines, suitable monomers are also quaternized 1-vinyl-2-imidazolines. They are prepared by reacting 1-vinyl-2-imidazolines, which may be substituted as described above, with known quaternizing agents. Examples of suitable quaternizing agents are $C_1$–$C_{18}$-alkyl chlorides or bromides, benzyl chloride or bromide, epichlorohydrin, dimethyl sulfate and diethyl sulfate. Epichlorohydrin, benzyl chloride, dimethyl sulfate and methyl chloride are preferably used.

For the preparation of water-soluble homopolymers, the compounds of the formula (III) are preferably polymerized in an aqueous medium.

Preferably used cationic polymers P) are copolymers of compounds of the formula (III) with acrylamide and/or methacrylamide. These copolymers then contain the compounds of the formula (III) only in effective amounts, ie. in an amount of from 1 to 50, preferably from 10 to 40, % by weight. Particularly suitable for the modification of natural starches are copolymers of from 60 to 85% by weight of acrylamide and/or methacrylamide and from 15 to 40% by weight of N-vinylimidazoline or N-vinyl-2-methylimidazoline. The copolymers may furthermore be modified by incorporating, by polymerization, other monomers, such as styrene, N-vinylformamide, vinyl formiate, vinyl acetate, vinyl propionate, $C_1$–$C_4$-alkyl vinyl ethers, N-vinylpyridine, N-vinylpyrrolidone, N-vinylimidazole, ethylenically unsaturated $C_3$–$C_5$-carboxylic acids and their esters, amides and nitriles, sodium vinylsulfonate, vinyl chloride and vinylidene chloride, in amounts of in general up to 25% by weight. Particularly suitable for the cationic modification of the starches A), B) or C) are copolymers P), which contain, as polymerized units, 1) from 70 to 97% by weight of acrylamide and/or methacrylamide,
2) from 2 to 20% by weight of N-vinylimidazoline or N-vinyl-2-methylimidazoline and
3) from 1 to 10% by weight of N-vinylimidazole.

These copolymers P) are prepared by free radical copolymerization of the monomers 1), 2) and 3) by known polymerization methods. They have K values of from 80 to 150 (determined according to H. Fikentscher in 5% strength aqueous sodium chloride solution at 25° C. and at a polymer concentration of 0.5% by weight).

Further suitable cationic polymers P) may contain amino alkylated esters and amides of acrylic acid and of methacrylic acid of the formula IV, homo- and copolymers being suitable.

Copolymers of from 1 to 99, preferably from 30 to 70, mol % of acrylamide and/or methacrylamide and from 99 to 1, preferably 70 to 30, mol % of dialkylaminoalkyl acrylates and/or methacrylates, for example copolymers of acrylamide and N,N-dimethylaminoethyl acrylate or N,N-diethylaminoethyl acrylate, are preferred. Basic acrylates are preferably present in a form neutralized with acids or in quaternized form. The quaternization may be effected as described above. The cationic polymers have K values of from about 30 to 300, preferably from 100 to 180 (determined according to H. Fikentscher in 5% strength aqueous sodium chloride solution, at 25° C. and at a polymer concentration of 0.5% by weight).

Copolymers P) of from 1 to 99, preferably from 30 to 70, mol % of acrylamide and/or methacrylamide and from 99 to 1, preferably from 70 to 30, mol % of dialkylaminoalkylacrylamide and/or dialkylaminoalkylmethacrylamide are also suitable. The basic acrylamides and methacrylamides are likewise preferably present in a form neutralized with acids or in quaternized form. Examples are N-trimethylammoniumethylacrylamide chloride, N-trimethylammoniumethylmethacrylamide chloride, trimethylammoniumethylacrylamide methosulfate, trimethylammoniumethylmethacrylamide methosulfate, N-ethyldimethylammoniumethylacrylamide ethosulfate, N-ethyldimethylammoniumethylmethacrylamide ethosulfate, trimethylammoniumpropylacrylamide chloride, trimethylammoniumpropylmethacrylamide chloride, trimethylammoniumpropylacrylamide methosulfate, trimethylammoniumpropylmethacrylamide methosulfate and N-ethyldimethylammoniumpropylacrylamide ethosulfate. Trimethylammoniumpropylmethacrylamide chloride is preferred.

Other suitable cationic polymers P) are polyallylamines. Polymers of this type are obtained by homopolymerization of allylamine, preferably in a form neutralized with acids or in quaternized form, or by copolymerization of allylamine with other monoethylenically unsaturated monomers, similarly to the N-vinylcarboxamide copolymers described above. Homo- and copolymers of diallyldimethylammonium chloride are preferred.

In a first novel process variant, at least one anionically modified starch A) is used for the cationic modification. Anionically modified starches are understood as meaning starches in which some or all of the free hydroxyl groups have been modified by anionic groups. In general, all natural or oxidatively, hydrolytically or enzymatically degraded starches mentioned below for the second process variant are suitable for the anionic modification. The anionic modification of starch is described in Gunther Tegge, Stärke und Stärkederivate, Hamburg, Bers-Verlag, 1984, pages 179 to 185. In general, the anionic modification is a reaction of the starch with α-halogencarboxylic acids, preferably chloroacetic acid, and the salts thereof, or an esterification of the starch with inorganic or organic acids as an anionic modifier M), dibasic or polybasic acids preferably being used. Acids suitable for the anionic modification are, for example, orthophosphoric acid, metaphosphoric acid, pyrophosphoric acid, polyphosphoric acids, phosphorous acid, sulfuric acid, pyrosulfuric acid, thiosulfuric acid, orthosalicic acid, metasalicic acid, pyrosalicic acid, polysalicic acids, orthoboric acid, metaboric acid, polyboric acids, O-esters of dithiocarbonic acid (xanthogenic acids), oxalic acid, malonic acid, succinic acid, glutaric acid, adipic acid, phthalic acid, terephthalic acid, malic acid, citric acid, etc. and salts thereof. The degree of esterification of the anionically modified starches thus obtained is in general from about 0.01 to 100, preferably from 0.1 to 50, in particular from 0.2 to 20, mol %, based on the free hydroxyl groups in the starch used for the modification. Polybasic acids may also be polyesterified. Starch esters which carry anionic functions, for example monoesters and diesters of starch with phosphoric acid, are preferably used for the novel process.

In a second process variant, the novel modification of the starch with the cationic polymer P) may be carried out using conventional starches which are not anionically modified, for example natural starches B) from the group consisting of corn starch, potato starch, wheat starch, rice starch, tapioca starch, sago starch, sorghum starch, cassava starch, pea starch and mixtures of the stated natural starches. Particularly used starches B) are those which have an amylopectin content of at least 80% by weight. Such starches B) can be obtained, for example, by fractionation of conventional natural starches or by culture from plants which produce practically pure amylopectin starch, described in Günther Tegge, Stärke und Stärkederivate, Hamburg, Bers-Verlag 1984, pages 157–160. Starches having an amylopectin content of at least 80% by weight are commercially available. They are generally referred to as waxy corn starch, waxy potato starch or waxy wheat starch. These may be used separately or as mixtures.

In addition to the natural starches B) starches C) which are not anionically modified are also suitable. Among those hydrolytically or enzymatically degraded starches C) are also suitable, for example dextrins, such as white or yellow dextrins and malto dextrins, or oxidized starches C), such as dialdehyde starch. Chemically modified starches C), for example starches esterified with inorganic or organic acids, in particular phosphated and acetylated starches, and starches etherified with organic halogen compounds, epoxides or sulfates are also suitable. Starches and processes for their degradation and their chemical modification are described in Ullmann's Encyclopedia of Industrial Chemistry, 5th edition, vol. A25, page 2 et seq., which is hereby incorporated by reference.

The modification of such starches B) or C) which have not yet been anionically modified is carried out by reaction in aqueous suspension or solution with the cationic polymers P) described above, in the presence of an anionic modifier M). Suitable anionic modifiers M) are the abovementioned ones. The reaction conditions correspond to those in the reaction of starches A), which have already been anionically modified, with cationic polymers P). The reaction is carried out in general in the absence of oxidizing agents, polymerization initiators and alkalis. The weight ratio of starch B) or C) to anionic modifier M) is in general from about 1:0.00001 to 1:1, preferably from 1:0.0001 to 1:0.1, in particular from 1:0.001 to 1:0.01. The pH of the mixture is in general from about 1 to 10, preferably from 1.5 to 9, in particular from 2.5 to 8.

The present invention furthermore relates to the use of the anionic starches modified according to the invention with cationic polymers P) and digested as dry strength and wet strength agents and as drainage aids and retention aids for paper, board and cardboard. They are added to the paper stock in an amount of from 0.5 to 5.0, preferably from 1.2 to 3.0,% by weight, based on dry paper stock, or are applied to the surface of a formed sheet. The pH of the reaction mixture is from 1.5 to 9.0, preferably from 2.5 to 8.0. The solution of the strength agent in water has a viscosity of from 50 to 10,000, preferably from 80 to 4000, mPa.s, measured in a Brookfield viscometer at 20 rpm and at 20° C., in conjunction with a solids concentration of 3.5% by weight. The modified starches prepared according to the invention are preferably added to the paper stock. Compared with the known paper assistants, they have improved retention in the paper stock, their use advantageously resulting in a lower COD value of the waste water than in the case of conventional paper assistants.

The novel cationically modified anionic starches may be used as dry strength agents in the production of all known paper, board and cardboard qualities, for example writing, printing and packaging papers. The papers may be produced from a large number of different fiber materials, for example from sulfite or sulfate pulp in the bleached or unbleached state, groundwood, waste paper, thermomechanical pulp (TMP) and chemothermomechanical pulp (CTMP). The pH of the stock suspension is from 4 to 10, preferably from 6 to 8.5. The dry strength agents may be used both in the production of base paper for papers having a low basis weight (LWC papers) and for cardboard. The basis weight of the papers is from 30 to 200, preferably from 35 to 150 g/m$^2$, while that of cardboard may be up to 600 g/m$^2$. Compared with papers produced in the presence of the same amount of natural starch, the paper products produced according to the invention have markedly improved strength, which can be quantitatively determined, for example, on the basis of the breaking length, the bursting pressure, the CMT value (CMT=Concora Medium Test) and the tear strength.

The nonrestrictive examples which follow illustrate the invention.

In the examples which follow, parts and percentages are by weight. The viscosities of the strength agents were determined in aqueous solution at a solids concentration of 3.5% by weight and a temperature of 20° C. in a Brookfield viscometer at 20 rpm. The K value of the polymer was determined according to H. Fikentscher, Cellulose Chemie 13 (1932), page 58 et.seq, in a 5% strength sodium chloride solution at 25° C. and at a polymer concentration of 0.5% by weight.

Polymer used for the cationic modification:
copolymer of 95 mol % of vinylamine and 5 mol % of vinylformamide in aqueous solution, pH 7, polymer content: 7.8% by weight, weight average molecular weight about 160,000 g/mol, viscosity 1800 mPas, prepared by hydrolysis of ppolyvinylformamide, K value 90, with sodium hydroxide solution.

EXAMPLE 1

A phosphated potato starch having a P$_2$O$_5$ content of 3% by weight was digested in a laboratory digester at 120° C. 15% by weight of polymer solution (≅1.17% by weight of polymer) were added to the starch. The charge density was −0.38 meq/g of solid, determined by polyelectrolyte titration with poly-DADMAC (DADMAC=diallyldimethylammonium chloride).

EXAMPLE 2

As described under Example 1, using 30% by weight of polymer solution (≅2.35% by weight of polymer).

Charge density: −0.21 meq/g (Poly-DADMAC).

EXAMPLE 3

As described under Example 1, using 60% by weight of polymer solution (≅4.70% by weight of polymer).

Charge density: +0.01 meq/g (potassium polyvinylsulfate).

EXAMPLE 4 (COMPARISON)

Phosphated potato starch according to Example 1 without cationizing agent.

Charge density: −0.62 meq/g (Poly-DADMAC).

EXAMPLE 5 (COMPARISON)

A natural potato starch was digested in a laboratory digester at 120° C. 15% by weight of polymer solution (≅1.17% by weight of polymer) were added to the starch.

Charge density: +0.03 meq/g (potassium polyvinylsulfate).

EXAMPLE 6 (COMPARISON)

Commercial cationic starch HI-CAT® (Roquette).

Charge density: +0.29 meq/g (potassium polyvinylsulfate).

USE EXAMPLES

In each case 2% (solid) of the starches according to Examples 1 to 6 were added to a paper stock suspension consisting of 40% deinked newsprint, 40% of newsprint which had not been deinked and 20% of beech sulfite pulp, having a consistency of 0.76% by weight.
1) After the addition of the starch, the fibers were filtered off and the COD values of the filtrate were determined according to DIN 38 409.
2) The paper stock was drained in a Schopper-Riegler apparatus and the drainage time (DT) was determined according to DIN ISO 5267.
3) Paper sheets having a basis weight of 120 g/m$^2$ were produced from the stock on a Rapid-Köthen sheet former, after the addition of the stock. The strength of these sheets was tested. The dry bursting pressure, (DBP, DIN ISO 2758), the flat crush resistance (CMT=Concora Medium Test, DIN EN 23035=ISO 3035) and dry breaking length (DBL, DIN ISO 1924) were determined by standard methods.

The results of the performance tests are shown in the table below.

| Example | COD (mg/l) | DT (s/500 ml) | DBP (kPa) | CMT (N) | DBL (m) |
| --- | --- | --- | --- | --- | --- |
| 0-value | 146 | 100 | 178 | 132 | 2901 |
| 1 | 275 | 99 | 176 | 144 | 3065 |
| 2 | 324 | 86 | 193 | 166 | 3366 |
| 3 | 166 | 77 | 214 | 189 | 3490 |
| 4 | 293 | 105 | 178 | 143 | 3065 |
| 5 | 330 | 112 | 178 | 143 | 3065 |
| 6 | 158 | 111 | 218 | 175 | 3397 |

The novel examples 1 to 3 show that the paper stock is substantially more rapidly drained as the result of the addition of an anionic starch which is modified with cationic polymers. Moreover, such starches produce an improvement in the strength of the paper compared with conventional starches according to Comparative Examples 4 to 6. There is substantial improvement with regard to the dry breaking length (DBL) and the CMT value and the bursting pressure is equivalent to that obtained with a cationic starch (Example 6).

We claim:
1. A process for the preparation of a starch which is modified with at least one cationic polymer, P, comprising:
    (a) reacting an anionically modified starch, A, with cationic polymer P, or
    (b) reacting a natural starch, B, or a starch, C, which is not anionically modified, with the cationic polymer P in the presence of an anionic modifier, M,
    wherein the starch is digested during the reaction with the polymer.
2. A process as claimed in claim 1, wherein the reaction is carried out in water or in an aqueous medium.
3. A process as claimed in claim 2, the weight ratio of water to starch is from 1:0.0005 to 1:0.2.

4. A process as claimed in claim 2, the weight ratio of water to starch is from 1:0.001 to 1:0.1.

5. A process as claimed in claim 2, the weight ratio of water to starch is from 1:0.02 to 1:0.06.

6. A process as claimed in claim 1, wherein the weight ratio of starch to polymer P is from 1:0.0005 to 1:2.

7. A process as claimed in claim 1, wherein the weight ratio of starch to polymer P is from 1:0.001 to 1:1.

8. A process as claimed in claim 1, wherein the weight ratio of starch to polymer P is from 1:0.01 to 1:0.1.

9. A process as claimed in claim 1, wherein the weight ratio of starch B or C to anionic modifier M is from 1:0.00001 to 1:1.

10. A process as claimed in claim 1, wherein the weight ratio of starch B or C to anionic modifier M is from 1:0.0001.

11. A process as claimed in claim 1, wherein the weight ratio of starch B or C to anionic modifier M is from 1:0.001 to 1:0.01.

12. A process as claimed in claim 1, wherein the starch is digested to a degree of at least 80%.

13. A process as claimed in claim 1, wherein polymer P contains ammonium or amino groups is.

14. A process as claimed in claim 1, wherein the cationic polymer P is a partially or completely hydrolyzed, homo- or copolymer of N-vinylcarboxamides, homo- or copolymer of diallyldialkylammonium compounds, N-vinylimidazoles, N-vinylimidazolines and aminoalkyl substituted esters and amides of acrylic acid and methacrylic acid and polyalkyleneamines.

15. A process as claimed in claim 1, wherein, for the preparation of the anionically modified starch A, a natural starch B or a starch C which has not been anionically modified is reacted with an anionic modifier M.

16. A process as claimed in claim 1, wherein the degree of esterification of the starch after anionic modification is from 0.01 to 100 mol %, based on the free hydroxyl groups.

17. A process as claimed in claim 1, wherein the degree of esterification of the starch after anionic modification is from 0.1 to 50 mol %, based on the free hydroxyl groups.

18. A process as claimed in claim 1, wherein the degree of esterification of the starch after anionic modification is from 0.2 to 20 mol %, based on the free hydroxyl groups.

19. A process as claimed in claim 1, wherein said anionically modified starch A) is reacted with a cationic polymer P), which comprises
i) 1 to 100 mol % of an N-vinylamine of formula I

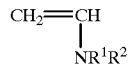

(I)

wherein $R^1$ and $R^2$ are independently hydrogen or alkyl, and
ii) 0 to 99 mol % of a monomer selected from vinylformiate, vinylacetate, vinylpropionate, N-vinylformamide, vinylalcohol, acrylonitrile and N-vinylpyrrolidone
in the polymerized form.

20. A process as claimed in claim 1, wherein said cationic polymer P) used is a hydrolyzed homopolymer of N-vinylformamide with a degree of hydrolyzation of 2 to 100 mol %.

21. A process as claimed in claim 20, wherein said cationic polymer P) used is a hydrolyzed homopolymer of N-vinylformamide with a degree of hydrolyzation of 30 to 95 mol %.

22. A starch modified with the cationic polymer P obtainable by a process comprising:
(a) reacting an anionically modified starch, A, with cationic polymer P, or
(b) reacting a natural starch, B, or a starch, C, which is not anionically modified, with the cationic polymer P in the presence of an anionic modifier, M,
wherein the starch is digested during the reaction with the polymer.

23. A process for the production of paper, board and cardboard, wherein a digested polymer-modified starch obtainable by a process comprising:
(a) reacting an anionically modified starch, A, with cationic polymer P, or
(b) reacting a natural starch, B, or a starch, C, which is not anionically modified, with the cationic polymer P in the presence of an anionic modifier, M,
wherein the starch is digested during the reaction with the polymer,
is used as a dry strength agent, wet strength agent, as a drainage aid and/or retention aid.

24. A method of strengthening paper, board or cardboard, comprising incorporating a modified starch obtainable by a process comprising:
(a) reacting an anionically modified starch, A, with cationic polymer P, or
(b) reacting a natural starch, B, or a starch, C, which is not anionically modified, with the cationic polymer P in the presence of an anionic modifier, M,
wherein the starch is digested during the reaction with the polymer,
into the paper, board or cardboard.

25. A paper, board or cardboard strengthened by the addition of polymer-modified starch obtainable by a process comprising:
(a) reacting an anionically modified starch, A, with cationic polymer P, or
(b) reacting a natural starch, B, or a starch, C, which is not anionically modified, with the cationic polymer P in the presence of an anionic modifier, M,
wherein the starch is digested during the reaction with the polymer.

* * * * *

UNITED STATES PATENT AND TRADEMARK OFFICE
CERTIFICATE OF CORRECTION

PATENT NO.    : 6,235,835 B1
DATED         : May 22, 2001
INVENTOR(S)   : Manfred Niessner et al.

It is certified that error appears in the above-identified patent and that said Letters Patent is hereby corrected as shown below:

<u>Column 2,</u>
Line 55, "nitrates", should read -- nitriles --.

<u>Column 5,</u>
Line 53, "SP$_4^2$–, HSO$_4$-,", should read -- SO$_4^{2-}$, HSO$_4$-, --.

Signed and Sealed this

Twenty-sixth Day of March, 2002

Attest:

Attesting Officer

JAMES E. ROGAN
Director of the United States Patent and Trademark Office